United States Patent
Wang et al.

(10) Patent No.: US 8,089,935 B2
(45) Date of Patent: Jan. 3, 2012

(54) METHOD FOR PERFORMING A HANDOFF IN A TELECOMMUNICATION SYSTEM

(75) Inventors: Yingmin Wang, Shanghai (CN);
Guiliang Yang, Shanghai (CN);
Yuanxin Qiao, Shanghai (CN)

(73) Assignee: Shanghai Ultimate Power Communications Technology Co., Ltd., Shanghai (CN)

( * ) Notice: Subject to any disclaimer, the term of this patent is extended or adjusted under 35 U.S.C. 154(b) by 842 days.

(21) Appl. No.: 11/958,261

(22) Filed: Dec. 17, 2007

(65) Prior Publication Data

US 2008/0102836 A1 May 1, 2008

Related U.S. Application Data

(63) Continuation of application No. PCT/CN2006/001235, filed on Jun. 6, 2006.

(30) Foreign Application Priority Data

Jun. 16, 2005 (CN) .............................. 200510077415

(51) Int. Cl.
*H04W 4/00* (2009.01)
(52) U.S. Cl. ........ 370/331; 370/332; 370/335; 370/342; 455/436; 455/440; 455/442; 455/443

(58) Field of Classification Search .................. 370/320, 370/331.332, 335, 342, 441; 455/63.1, 67.11, 455/67.13, 69, 421, 422.1, 436–444, 502; 375/144, 148, 267, 346
See application file for complete search history.

(56) References Cited

U.S. PATENT DOCUMENTS

| 7,502,614 | B2 * | 3/2009 | Uchida et al. ................ 455/436 |
| 2005/0070287 | A1 * | 3/2005 | Cave et al. .................... 455/436 |
| 2005/0111408 | A1 * | 5/2005 | Skillermark et al. ......... 370/331 |
| 2005/0232195 | A1 * | 10/2005 | Jones ............................ 370/329 |
| 2008/0123611 | A1 * | 5/2008 | Wang et al. ................... 370/342 |
| 2008/0205305 | A1 * | 8/2008 | Li et al. ......................... 370/280 |
| 2009/0010228 | A1 * | 1/2009 | Wang et al. ................... 370/335 |

* cited by examiner

*Primary Examiner* — Anthony Addy
(74) *Attorney, Agent, or Firm* — Hamre, Schumann, Mueller & Larson, P.C.

(57) ABSTRACT

A method is disclosed for performing a handoff in a telecommunication system. The method comprises: performing a first multi-cell joint detection process for decoding the communications within the home cell when a mobile terminal enters a handoff region between a home cell and one or more neighboring cells; performing a handoff process when the mobile terminal is in the home cell to join a target neighboring cell; and performing a second multi-cell joint detection process for decoding the communications between the mobile terminal and the target neighboring cell. In this manner, decoding for uplink and/or downlink communications is improved, and throughout and performance of the telecommunication system is enhanced.

29 Claims, 2 Drawing Sheets

METHOD FOR PERFORMING A HANDOFF IN A TELECOMMUNICATION SYSTEM

REFERENCE TO RELATED APPLICATION(S)

This application is a continuation of PCT/CN2006/001235, filed Jun. 6, 2006, that claims the benefit of the priority date of Chinese Patent Application No. 200510077415.X, filed on Jun. 16, 2005, the contents of which both are herein incorporated by reference in their entireties.

BACKGROUND

In cellular telephone or other wireless voice or data communication systems, a service area is generally divided into cells, each of which may be further divided into sectors.

Each cell may be served by one or more base stations (BSs), which is further connected to a message switching center ("'MSC'"), a subscriber management system ("SMS"), or a data router via a base station controller ("BSC"). A plurality of mobile communication devices/terminals ("MT") are connected to the MSC, the SMS, or the router by establishing radio links with one or more nearby base stations.

One commonly used type of cellular radiotelephone communication system is referred to as a Code Division Multiple Access (CDMA) system, in which the radio signals of different users share the same frequency spectrum at the same time, in contrast to previous Frequency Division Multiple Access (FDMA) or Time Division Multiple Access (TDMA) systems.

In a typical CDMA cellular radiotelephone communication system, an MT communicates with a base station having the strongest available signal. In order to track the available signals, the MT maintains a list of available base stations. Specifically, each base station in the CDMA system transmits an unmodulated "pilot" signal at a set of predetermined frequencies. MT receives the pilot signals and determines which pilot signals are the strongest. A "searcher" unit located in the MT commonly performs the signal detection and intensity measurement functions. The results of the searcher are reported to the current base station. The current base station then instructs the MT to update a list of available base stations maintained by the MT. Typically, the list is further divided into three operative sets, an active set, a candidate set, and a neighbor set. The active set contains a list of the base stations with which the MT is currently communicating. The candidate set is a list of base stations which may change into the active set, and the neighbor set is a list of base stations which are being monitored, but less frequently.

Since the coverage area of a telecom system is traditionally divided into cells, an MT may move from one cell to another. As an MT moves and the signal from its currently active base station weakens, the MT must access a new base station. Based upon the results of the searcher and the instructions received back from the new base station, the MT will communicate with a different base station. The process of switching the communication link from one base station to another is known as a handoff process.

In order to transfer an MT user's communication without interruption, the communication link must be switched to the next base station. There are generally two types of handoff, a soft handoff and a hard handoff. If a new link is established before current link is terminated, it is known as the soft handoff. In contrary, in a hard handoff, the current link will be terminated first and then a new link with the new base station is established. Since the hard handoff will cause a service interruption for the MT user, although temporarily, it lowers the quality of service (QOS) for the cellular telephone user. For example, if the MT is engaged in a voice service, the user will most likely experience degraded voice quality or even call drop. If an MT is transmitting data, significant transmission delays (e.g., due to retransmission errors) will be likely to occur. The handoff usually occurs when an MT travels to a border area where base stations in multiple neighboring cells are available. When the MT is in the border area, signal interferences from multiple cells are severe, and the handoff procedure directly impacts communication quality.

An improved method and system for effectively performing a handoff procedure to achieve better communication quality would be desirable.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

A method is disclosed for performing a handoff in a telecommunication system. In one example, the method comprises: performing a first multi-cell joint detection process for decoding the communications within the home cell when a mobile terminal enters a handoff region between a home cell and one or more neighboring cells; performing a handoff process when the mobile terminal is in the home cell to join a target neighboring cell; and performing a second multi-cell joint detection process for decoding the communications between the mobile terminal and the target neighboring cell. In this manner, decoding for uplink and/or downlink communications is improved, and throughout and performance of the telecommunication system is enhanced.

To the accomplishment of the foregoing and related ends, the following description and annexed drawings set forth certain illustrative aspects and implementations. These are indicative of but a few of the various ways in which one or more aspects may be employed. Other aspects, advantages, and novel features will become apparent from the following detailed description when considered in conjunction with the annexed drawings

DETAILED DESCRIPTION

Figure 1:
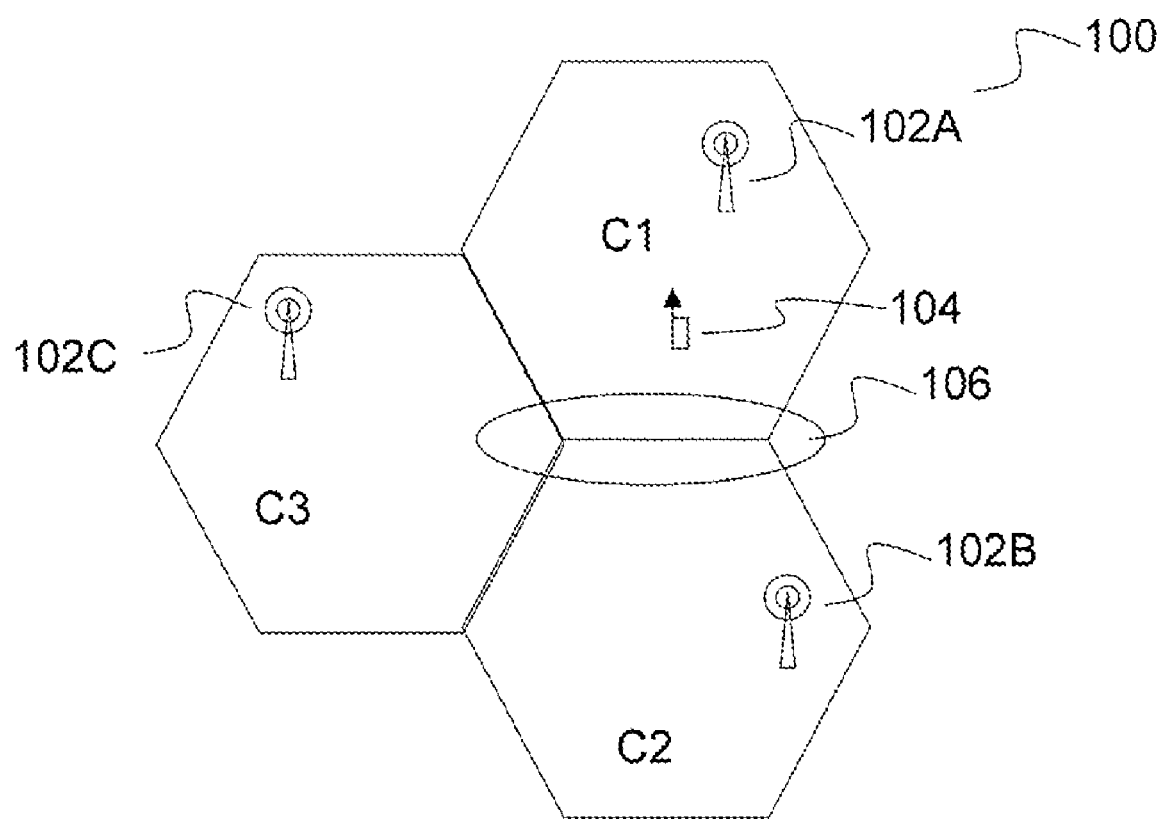
FIG. 1 is a schematic diagram illustrating a wireless communication network.

The following discussion is now made with reference to the drawings, wherein like reference numerals are used to refer to like elements throughout. In the following description, for purposes of explanation, numerous specific details are set forth in order to provide a more thorough understanding. It may be evident, however, that the claimed subject matter may be practiced with or without these specific details. In other instances, well-known structures and devices are shown in block diagram, or other, form to facilitate the description. Although the discussion is made with regard to a few embodiments, it should be understood that the instant disclosure is applicable to different multiple access technologies which implement frequency division and/or time division for multiple access channelization. The description below may also be applied in the environments of CDMA systems.

FIG. 1 illustrates a telecommunication system 100 arranged for providing voice and data communications to one or more mobile terminals. For the purpose of illustration, merely three cells C1, C2, and C3, are depicted. Respective cells have a base station (BS) 102A-102C that is responsible for communicating with all mobile terminals 104 within the boundaries of the cell. When MT 104, which is initially operating in cell C1, moves close to a border area 106, a handoff procedure will be performed to connect MT 104 to a neighboring cell depending on which direction it is moving. Assuming MT 104 is moving to cell C3, a necessary handoff would be performed to connect MT 104 to BS 102C. However, conventionally, BS 102A treats the signals from BS 102B and BS 102C as noise while evaluating handoff possibilities. It should be understood that such signal interferences are significant at border areas 106.

In a time-slot CDMA system, as it inherently has the characteristics of both Code Division Multiple Access (CDMA) and Time Division Multiple Access (TDMA) systems, several users share the same frequency band, but transmit and receive in different slots (bursts) or codes by their specific signature sequences. The performance of a time-slot CDMA system in a multipath delay spread environment is limited by the multiple access interference (MAI) due to the lack of orthogonality of spreading codes at the receiver and by the inter-symbol interference (ISI) between consecutive symbols of a single user.

As understood in the art, the inter-symbol interference refers to the fact that symbols within each of the individual spreading signals interfere with their respective adjacent symbols. On the other hand, multiple-access interference refers to the fact that the code sequences are no longer orthogonal after they propagate through the composite propagation channel and arrive at the receiver, although a predetermined set of code sequences are designed to be mutually orthogonal at the transmitter. However, as a result of non-orthogonality, symbols of the spreading signals interfere with one another, and each acts as a noise source for others.

Where the length of the spreading code sequence is comparable with the length of the composite propagation channel, the received signals are not mutually orthogonal, and thus the output of a matched filter contains interferences from the remaining user signals. In order to eliminate this continuous MAI as well as the inevitable ISI, it is necessary to perform additional operations at the output of the matched filters. The combined operation of matched filtering and MAI-ISI elimination is referred to as joint-detection. Joint-detection schemes attempt to eliminate MAI and ISI by suppressing the mutual interference existing among all the transmitted symbols carried by the user signals.

Usually, conventional single user CDMA detectors, such as the matched filter and the rake receiver, are optimized for detecting the signal of a single user in the absence of ISI and taking the MAI as additional noise. Instead, the joint detection process, by exploiting the knowledge about the signature sequences and channel impulse responses, deals with both ISI and MAI. As the MT travels within the border area and a handoff is to be performed, there will be various signal interferences from various sources including the aforementioned inter-cell interference.

In the CDMA system illustrated in FIG. 1, since the same frequency is used by all three cells, no frequency change is needed although the code channel needs to be altered for handoff. That is, when performing the handoff, the new base station from the new cell will provide a new code channel for the communications. If a hard handoff is performed, due to the inter-cell interference, the communication quality cannot be assured. If a soft handoff is performed, because more code channels have to be involved, the inter-cell interference is more severe.

An improved handoff process is described herein by using a multi-cell joint detection process while an MT is in the border area so as to improve the communication quality during the handoff. Traditionally, a joint detection process is limited to analyze multiple MTs in a particular cell, but the improved handoff process proposed includes a multi-cell joint detection process which analyzes multiple communication signals from multiple cells.

Figure 2:
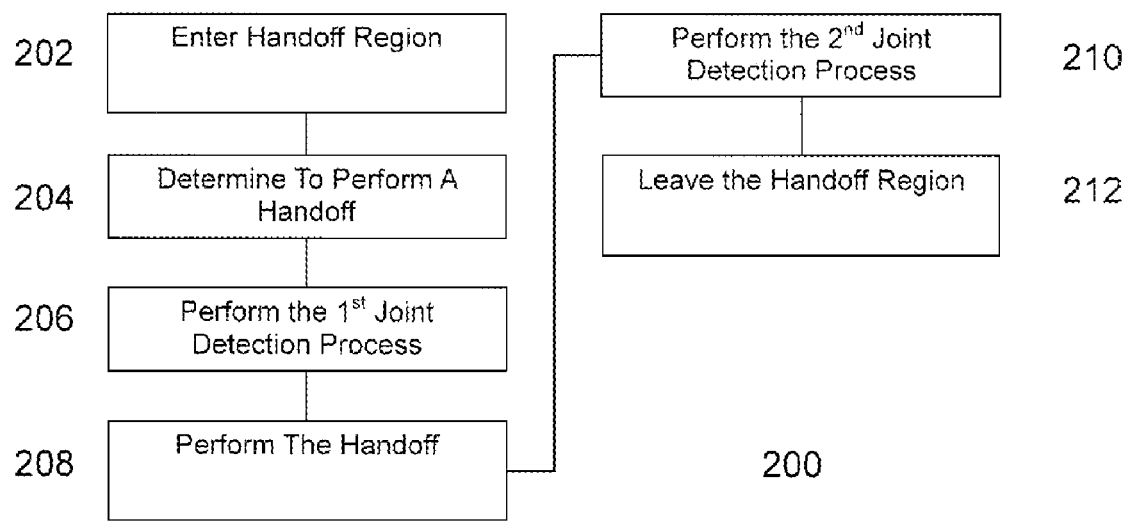
FIG. 2 is a flow diagram for performing an improved handoff process.

FIG. 2 is a flow diagram 200 illustrating an improved handoff process. When a mobile terminal enters a handoff region such as a border area from its home cell at 202, it is determined whether a handoff is to be performed at 204. This is generally determined by the communications between the BS and the MT. While the MT is still in its home cell, a first multi-cell joint detection process is performed at 206. When the MT is in the border area, there are communication signals from multiple sources (e.g., from multiple cells) interfering with the communication between the MT and its current home cell BS. When the first multi-cell joint detection process is carried out, it considers code channels from the neighboring cells. The multi-cell joint detection process provides necessary information for devising a first decoding mechanism to mitigate interference, which enhances decoding for the communications within the home cell. For example, after a multi-cell channel estimation, one or more code channels from the neighboring cells are identified, especially the one the mobile terminal is moving to.

The detailed multi-cell joint detection process and the multi-cell channel estimation can refer to Chinese Patent Application No. 200410080196.6 filed by the applicant of the present application, and incorporated by reference herein in its entirety. By further selectively grouping these code channels for performing the first multi-cell joint detection process, the interference originated from the target neighboring cell will be treated differently and isolated from the rest of the noise. The decoding mechanism such as a decoding matrix can be obtained and used to process the communication between the MT and the BS. Based on this decoding mechanism, a handoff process 208 can be transacted. As a result of the enhanced decoding mechanism, the MT communicates with the BS with improved signal quality when being in the home cell, and it further switches over to the target neighboring cell to complete the handoff process. The handoff process can be either a hard handoff or a soft handoff. After the handoff is performed, a second multi-cell joint detection process 210 is then performed for devising a second decoding mechanism for communications between the MT and the target neighboring cell. The result of the second multi-cell joint detection process, like the first multi-cell joint detection process, enhances the second decoding mechanism, which is used for future communications between the MT and the target BS in the target neighboring cell. When the MT moves further away from the handoff region at 212, the home cell will no longer be taken into account in future joint detection processes, and code channels from the neighboring cells of the target neighboring cell will also no longer be taken into account of future joint detection processes when the mobile terminal leaves the handoff region and moves in the target neighboring cell (e.g., when the intensity of the interference signal from the corresponding neighboring cell drops below a second predetermined threshold).

It should be understood that, unlike conventional processes, this handoff process considers both home and target neighboring cells as interference sources in devising an accurate decoding mechanism. For example, when the first decoding mechanism is devised by performing the first multi-cell joint detection process, the interference from the target neighboring cell is identified and not included with other noise. When the joint detection process is performed based on pilot channel estimation codes of the home cell and various neighboring cells, a multi-cell channel estimation process can be implemented to obtain pilot channel estimation of the home cell as well as the neighboring cells. Then, according to the correlation between the code channels and the correlation between the pilot channel estimation codes, one or more arrangements for grouping the code channels are selected to designate different code channels for the cells neighboring to each other. In other words, code channels are selected carefully for performing the multi-cell joint detection. Finally, based on the pilot channel estimation result and the code channel grouping result and their correlation, multi-channel signals are processed to obtain detection results based on the multi-cell joint detection process. Obviously, the selection of different code channels can vary depending on the design of the telecommunication system. The selection can be based on cell boundary, code channel power intensity, relative signal intensity, or any of the combinations. It should be also understood that the multi-cell joint detection process can vary in its operation during handoff. In short, this multi-cell joint detection process, which considers a selected number of neighboring cells, enhances the decoding mechanism to promote improved communications. Similarly, when an MT is in the new cell, the home cell interference is restrained in the second multi-cell joint detection process so the second decoding mechanism is also enhanced for future communications.

It is to be noted that the aforementioned identification and selection can use command exchange between the home cell and the neighboring cells for identifying and selecting. Also, code channels can be identified and selected by means of, for example, identifying spreading code information of the neighboring cells through predetermined one-to-one correlation based on channel estimation.

While the first multi-cell joint detection process is being performed, the code channels are carefully selected for the purpose of analysis. For example, when the first multi-cell joint detection is being prepared (e.g., to be selected), code channels used by neighboring cells are to be above certain threshold signal intensity (e.g., a first threshold). In other words, merely those signals that impose significant impact on the communication of the MT will be considered. As the threshold can be varied, different numbers of code channels can be involved in the process. It should be understood that the more channels are involved, the more resources have to be used for the process. It is up to the telecom system designer to determine the threshold based on a cost-benefit analysis. The system can also predetermine a fixed number of channels to be considered for the first or second multi-cell joint detection process. Or, the system can rank all the neighboring cells in terms of their signal intensity for analysis purposes, but only select a group of cells having the highest rankings. As stated above, because an MT and BS are aware of a list of other BSs that are available to the MT, the system can prioritize the BS or cells based on the signal intensity of their pilot or code channels.

Similar to the first multi-cell joint detection process, the number of the code channels included in the second multi-cell joint process can be selected intelligently, although differently from those used in the first multi-cell joint detection process. It can be seen that when an MT moves further away from its home cell and moves further into the new cell, the signals from the home cell will fade, and at a certain point (e.g., where the signal intensity is below a second threshold that is smaller than the first threshold), their code channels will not be taken into account in the multi-cell joint detection any longer. It should be understood that the boundaries of the border areas are virtual and no physical line can be defined. Whether an MT has entered the virtual border area can be determined by its signal intensity with regard to its communication with its original (home) BS. For example, a signal-noise-ratio (SNR) can be one norm to determine whether the MT has entered the border area. Other similar criteria including other forms of interference signal intensity measurement can be used to determine the border area. For example, it is also true that when an MT drops its original home cell from the joint detection process, it has left the border area.

The first or second multi-cell joint detection process can be implemented for uplink or downlink communications, or both. As such, the BS, the MT or both can carry out the multi-cell joint detection process. Interference detection can be provided or detected through various methods. For example, the communications among different BSs can be used to identify some characteristics of certain signal interferences. The telecom system can also preset some parameters for readily identifying sources of the signals from different BSs. Also, the interference parameters can be obtained through testing.

In order to perform the multi-cell joint detection process, a joint detection receiver can be comprised in the BS or the MT, or both. A typical joint detection receiver is provided with all the codes and is therefore able to decode all the channels within a given time slot. One known method of estimating the unknown transmitted symbol sequence in a joint-detection receiver is zero-forcing block-linear equalization. Normally, the joint-detection equations or arithmetic can be solved by using propagation channel estimation and the knowledge of the used spreading codes. In one example, during the multi-cell joint detection process, the channel estimation codes of the home cell and the neighboring cells can be used to obtain the channel estimation for both the home cell and the neighboring cells through methods such as the multi-set channel estimation method. Then, based on the predetermined arrangement between the code channels and channel estimation codes of the home cell and the neighboring cells, code channels are divided into different groups. The grouping can be realized based on various criteria such as cell separation, code channel power intensity, and/or any other reasonable methods. Based on the channel estimation of the home and neighboring cells, the multi-cell joint detection process is performed to examine the signals in different code channels.

It is to be noted that different choices of multi-cell joint detection can be performed based on different situations. The first or the second multi-cell joint detection process mentioned above can be based on any multi-cell joint detection process (for example, that in the Chinese Patent Application No. 200410080196.6). However, in other embodiments, the first multi-cell joint detection process can further include multi-cell channel estimation or code channel selection or both for the communications within the home cell; or for the communications within the home cell, the first multi-cell joint detection process including a first multi-cell channel estimation can be first performed, and then one or more code channel are selected, and for the communications within the target cell, the second multi-cell joint detection process including a second multi-cell channel estimation can be first performed, and then one or more code channels are selected. Therefore, such different arrangements in multi-cell joint detection can further reduce the calculation time and expense in multi-cell detection.

It will be appreciated that, as used in this application and appended claims, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been illustrated and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A method for performing a handoff in a telecommunication system comprising:
   performing a first multi-cell joint detection process for decoding communications within a home cell when a mobile terminal enters a handoff region between the home cell and one or more neighboring cells, wherein performing the first multi-cell joint detection process includes:
      performing a multi-cell channel estimation to obtain pilot channel estimation codes for both the home cell and the one or more neighboring cells;
      selecting code channels neighboring to each other based on a cell boundary and a code channel power intensity of the one or more neighboring cells;
      grouping the selected code channels to obtain a code channel grouping result according to correlation between the code channels and correlation between the pilot channel estimation codes; and
      performing the first multi-cell joint detection process based on the pilot channel estimation codes and the code channel grouping result of the home cell and the one or more neighboring cells;
   performing a handoff process when the mobile terminal is in the home cell to join a target neighboring cell; and
   performing a second multi-cell joint detection process for decoding communications between the mobile terminal and the target neighboring cell after the handoff process is performed.

2. The method of claim 1, comprising:
using command exchange between the home cell and the neighboring cells for selecting one or more code channels.

3. The method of claim 1, comprising:
identifying spreading code information of the neighboring cells through predetermined one-to-one correlation based on channel estimation.

4. The method of claim 1, comprising:
selecting the code channels from the neighboring cells if the intensity of an interference signal or signal-noise-ratio (SNR) from the corresponding neighboring cell is above a first predetermined threshold.

5. The method of claim 1, comprising:
including an uplink multi-cell joint detection process.

6. The method of claim 1, comprising:
including a downlink multi-cell joint detection process.

7. The method of claim 1, comprising:
performing the first multi-cell joint detection process at either a base station or the mobile terminal.

8. The method of claim 1, comprising:
not including interference of the target neighboring cell for decoding the communications within the home cell.

9. The method of claim 1, comprising:
terminating communications between the mobile terminal and the home cell prior to connecting the mobile terminal to the target neighboring cell.

10. The method of claim 1, comprising:
terminating communications between the mobile terminal and the home cell after connecting the mobile terminal to the target neighboring cell.

11. The method of claim 1, comprising:
identifying interference from the home cell.

12. The method of claim 1, comprising:
not including interference of the home cell for decoding the communications within the target neighboring cell.

13. The method of claim 1, comprising:
not including code channels from the neighboring cells in future joint detection processes when the mobile terminal leaves the handoff region and moves into the target neighboring cell.

14. The method of claim 1, comprising:
not including code channels from one or more selected neighboring cells in future joint detection processes when the intensity of an interference signal or signal-noise-ratio (SNR) from the corresponding neighboring cell drops below a second predetermined threshold.

15. A method for performing a handoff in a telecommunication system comprising:
   performing a first multi-cell joint detection process when a mobile terminal enters a handoff region between a home cell and one or more neighboring cells by performing multi-cell channel estimation and code channel selection to decode communications within the home cell, wherein performing the first multi-cell joint detection process includes:
      performing a multi-cell channel estimation to obtain pilot channel estimation codes for both the home cell and the one or more neighboring cells;
      selecting code channels neighboring to each other based on a cell boundary and a code channel power intensity of the one or more neighboring cells;

grouping the selected code channels to obtain a code channel grouping result according to correlation between the code channels and correlation between the pilot channel estimation codes; and performing the first multi-cell joint detection process based on the pilot channel estimation codes and the code channel grouping result of the home cell and the one or more neighboring cells;

performing a handoff process when the mobile terminal is in the home cell to join a target neighboring cell; and performing a second multi-cell joint detection process for decoding the communications between the mobile terminal and the target neighboring cell after the handoff process is performed.

16. The method of claim 15, the code channel selection comprising using command exchange between the home cell and the neighboring cells for selecting one or more code channels.

17. The method of claim 15, the code channel selection comprising identifying spreading code information of the neighboring cells through predetermined one-to-one correlation based on channel estimation.

18. The method of claim 15, comprising:

the code channel selection further includes selecting the code channels from the neighboring cells if the intensity of an interference signal or signal-noise-ratio (SNR) from the corresponding neighboring cell is above a first predetermined threshold.

19. The method of claim 15, comprising:

identifying interference from the home cell; and not including the interference from the home cell for decoding the communications within the target neighboring cell.

20. A method for performing a handoff in a telecommunication system comprising:

performing a first joint detection process including a first multi-cell channel estimation when a mobile terminal enters a handoff region between a home cell and one or more neighboring cells, selecting one or more code channels from the neighboring cells, and decoding the communications within the home cell, wherein performing the first joint detection process includes:

performing a multi-cell channel estimation to obtain pilot channel estimation codes for both the home cell and the one or more neighboring cells;

selecting code channels neighboring to each other based on a cell boundary and a code channel power intensity of the one or more neighboring cells;

grouping the selected code channels to obtain a code channel grouping result according to correlation between the code channels and correlation between the pilot channel estimation codes; and performing the first multi-cell joint detection process based on the pilot channel estimation codes and the code channel grouping result of the home cell and the one or more neighboring cells;

performing a handoff process when the mobile terminal is in the home cell to join a target neighboring cell; and performing a second multi-cell joint detection process including a second multi-cell channel estimation, selecting one or more code channels from the neighboring cells, and decoding the communications within the target cell between the mobile terminal and the target neighboring cell after the handoff process is performed.

21. The method of claim 20, comprising:

using command exchanges between the home cell and the neighboring cells for selecting one or more code channels.

22. The method of claim 20, comprising:

identifying spreading code information of the neighboring cells through predetermined one-to-one correlation based on channel estimation.

23. The method of claim 20, comprising:

selecting the code channels from the neighboring cells if the intensity of an interference signal or signal-noise-ratio (SNR) from the corresponding neighboring cell is above a first predetermined threshold.

24. The method of claim 20, comprising:

performing an uplink multi-cell joint detection process.

25. The method of claim 20, comprising:

performing a downlink multi-cell joint detection process.

26. The method of claim 20, comprising:

not including in the first multi-cell joint detection process interference of the target neighboring cell for decoding the communications within the home cell.

27. The method of claim 20, comprising:

not including in the second multi-cell joint detection process interference of the home cell for decoding the communications within the target neighboring cell.

28. The method of claim 20, comprising:

not including code channels from the neighboring cells in future joint detection processes when the mobile terminal leaves the handoff region and moves in the target neighboring cell.

29. The method of claim 20, comprising:

not including code channels from one or more selected neighboring cells in future joint detection processes when the intensity of the interference signal or signal-noise-ratio (SNR) of the corresponding neighboring cells drops below a second predetermined threshold.

* * * * *